United States Patent
Radzevich et al.

(10) Patent No.: US 8,133,146 B2
(45) Date of Patent: Mar. 13, 2012

(54) GEAR TRAIN WITH SPLIT TORQUE

(75) Inventors: Stephen P. Radzevich, Sterling Heights, MI (US); Paul N. Herrmann, Clinton Township, MI (US); Steven A. Rudko, Eastpointe, MI (US)

(73) Assignee: Eaton Corporation, Cleveland, OH (US)

( * ) Notice: Subject to any disclaimer, the term of this patent is extended or adjusted under 35 U.S.C. 154(b) by 400 days.

(21) Appl. No.: 12/423,113

(22) Filed: Apr. 14, 2009

(65) Prior Publication Data

US 2010/0261568 A1    Oct. 14, 2010

(51) Int. Cl.
  *F16H 48/10*    (2006.01)
(52) U.S. Cl. ........ 475/248; 475/226; 475/251; 475/252; 74/425; 74/458
(58) Field of Classification Search .................. 475/220, 475/226, 248, 251, 252, 333, 344; 74/458, 74/425, 52
  See application file for complete search history.

(56) References Cited

U.S. PATENT DOCUMENTS

| | | | |
|---|---|---|---|
| 2,696,125 A | 12/1954 | Saari | |
| 2,954,704 A | 10/1960 | Saari | |
| 3,237,483 A | 3/1966 | Kelley et al. | |
| 4,791,832 A | 12/1988 | McCaw | |
| 6,325,738 B1 | 12/2001 | Caringella et al. | |
| 6,599,217 B2 | 7/2003 | Caringella et al. | |
| 6,634,979 B1 | 10/2003 | Quaife | |
| 6,912,786 B2 * | 7/2005 | Jinkins et al. | 29/893.35 |
| 2010/0144484 A1 * | 6/2010 | Bawks | 475/226 |

FOREIGN PATENT DOCUMENTS

| | | | |
|---|---|---|---|
| EP | 0356401 A2 * | 2/1990 | |
| WO | 02065000 A2 | 8/2002 | |

OTHER PUBLICATIONS

Duwayne Paul, Spiroid and Helicon Gearing, ITW Spiroid Brochure, Illinois Tool Works, Alexandria, MN.
European Patent Office; International Search Report and the Written Opinion of the International Searching Authority issued in the counterpart PCT Application No. PCT/IB2010/000822. Date of mailing: Jul. 28, 2010.
The International Bureau of WIPO; International Preliminary Report on Patentability issued in the counterpart PCT Application No. PCT/IB2010/000822. Date of mailing: Oct. 27, 2011.

* cited by examiner

*Primary Examiner* — David D Le
*Assistant Examiner* — Huan Le
(74) *Attorney, Agent, or Firm* — Dykema Gossett PLLC (57) ABSTRACT

A gear train is provided that includes at least one side gear comprising a helical face gear and a plurality of helical pinions in meshing engagement with the helical face gear. The gear train may further include an absorber configured to provide an axial force on at least one of the plurality of helical pinions. A differential may also be provided including a differential case and a gear train disposed in the differential case. The gear train includes at least one side gear comprising a helical face gear and a plurality of helical pinions in meshing engagement with the helical face gear. The gear train in the differential may further include a means for providing an axial force on at least one of the plurality of helical pinions.

17 Claims, 5 Drawing Sheets

FIG. 8 ns, wherein:
GEAR TRAIN WITH SPLIT TORQUE

TECHNICAL FIELD

The present invention relates to a gear train which features torque sharing among multiple pinions, including an improved gear train with split torque and an improved interaction of the pinions with other elements of the gear train.

BACKGROUND

Gear trains that require torque sharing among multiple pinions may be found in the automotive industry (e.g., automobile differentials, automobile transmissions, etc.), the aerospace industry (e.g. helicopter transmissions, etc.), the epicyclical transmissions of electric wind-power stations, as well as in many other fields of engineering.

Gear trains may encounter errors caused by the manufacturing of gear train components, the assembly of the gear train, and/or the elastic deformation of gear train components under an operating load, all of which may be unavoidable and may cause unequal torque sharing among the pinions of a gear train.

Increased accuracy for manufacturing of pinions and side gears that make up a gear train may be a straightforward way to reduce instances of unequal torque sharing among multiple pinions caused by misalignment and/or deviation from proper meshing between the pinions and side gears. However, the increase in manufacturing accuracy can be extremely costly and may not be commercially viable in the high volume production of gears for gear trains with split torque.

It may be desirable to design a gear train that is capable of substantially equal torque sharing among all pinions of the gear train without requiring costly changes in manufacturing methods. Moreover, substantially equal torque sharing in a gear train with split torque may make it possible to at least double torque density through the gear train.

SUMMARY

A gear train is provided that includes at least one side gear comprising a helical face gear and a plurality of helical pinions in meshing engagement with the helical face gear. The gear train may further include an absorber configured to provide an axial force on at least one of the plurality of helical pinions.

A differential may also be provided including a differential case and a gear train disposed in the differential case. The gear train includes at least one side gear comprising a helical face gear and a plurality of helical pinions in meshing engagement with the helical face gear. The gear train in the differential may further include a means for providing an axial force on at least one of the plurality of helical pinions.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present invention, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as embodied by the appended claims.

Figure 1:
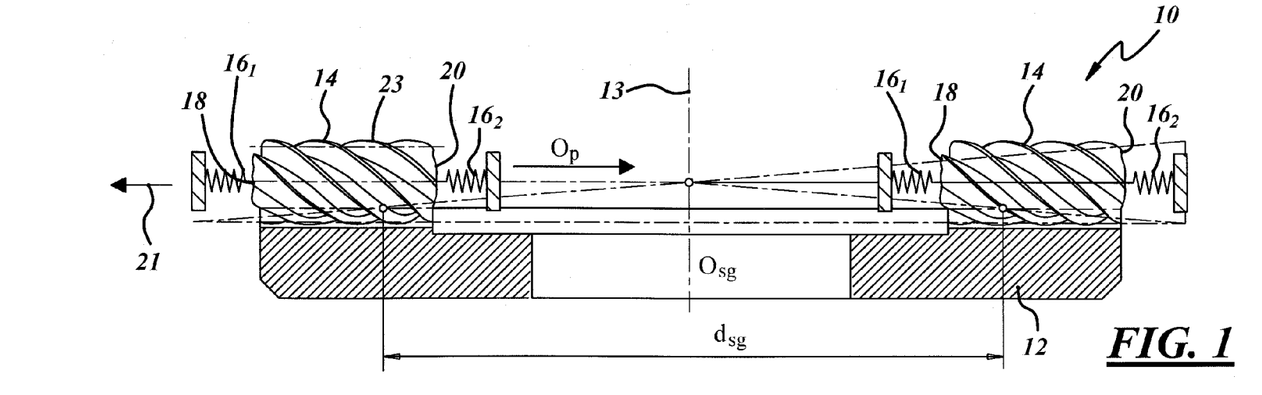
FIG. 1 is a partial sectional view of a gear train in accordance with an embodiment of the invention.

Referring to FIG. 1, a gear train 10 in accordance with the present invention may comprise one or more side gears 12, a plurality of pinions 14, and an absorber 16 configured to provide an axial force on at least one of the plurality of pinions 14. The absorber 16 may also be configured to absorb manufacturing errors that may cause misalignment of the pinions 14 and side gear 12 and/or deviation from proper meshing between the pinions 14 and side gear 12.

Figure 2A:
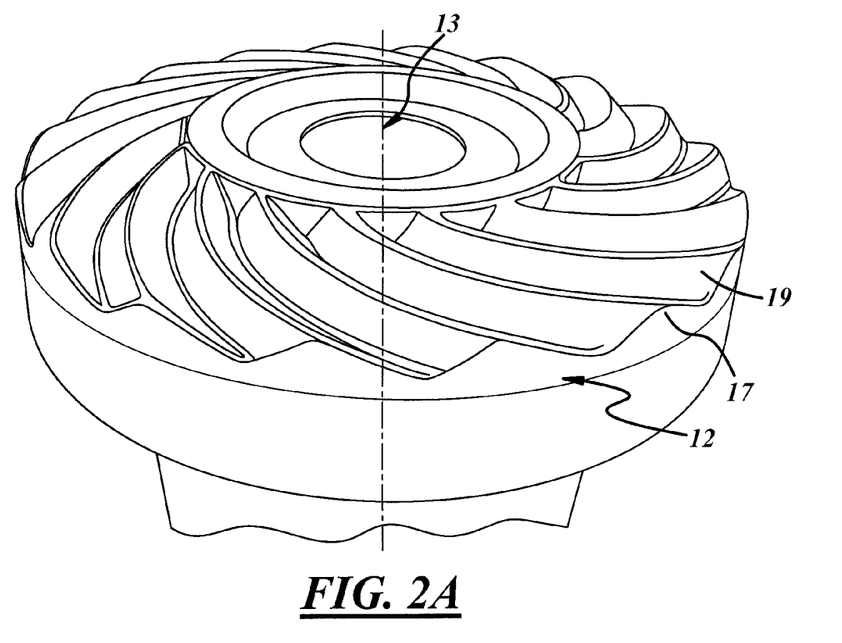
FIG. 2A is a perspective view of a face with helical teeth of a side gear of a gear train in accordance with an embodiment of the invention.

Although a single side gear 12 is illustrated in FIG. 1, gear train 10 may include a plurality of side gears 12 in accordance with an embodiment of the invention. The number of side gears 12 may be two. Accordingly, the plurality of pinions 14 may engage two side gears 12. Although two side gears are mentioned in detail, there may be fewer or more side gears in other embodiments. Side gears 12 may transmit torque from the pinions 14 to an output (e.g., axle shafts). Each side gear 12 may have an axis of rotation 13. Each side gear 12 may also have an inner axially aligned opening 15 through which the axle shaft (not shown) may connect to the side gear 12 via a splined interconnection. Referring now to FIG. 2A, in an embodiment, each side gear 12 may have a face with helical teeth 17. In an embodiment, a substantially flat surface may oppose the face with helical teeth 17 on the side gear 12.

Figure 2B:
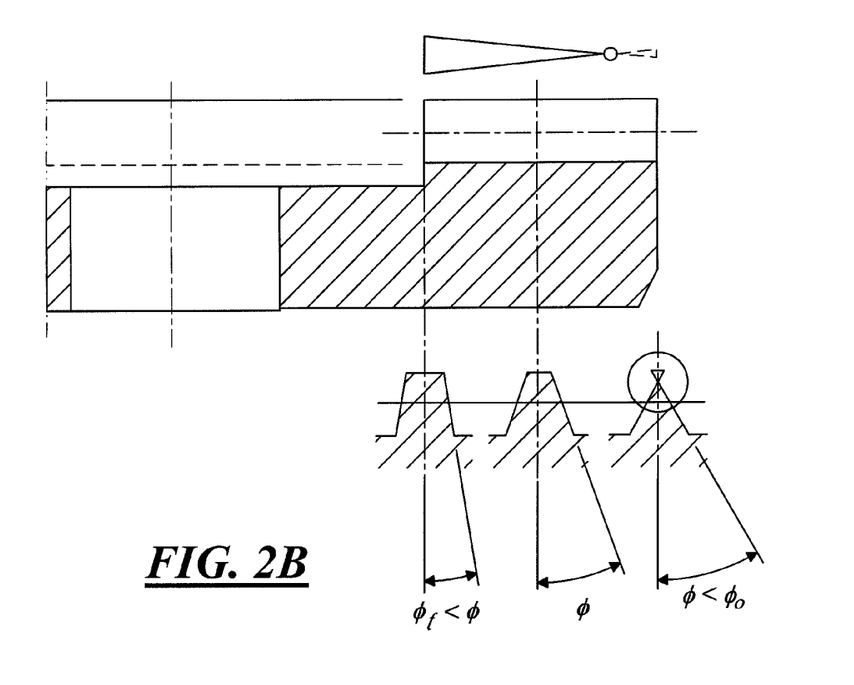
FIG. 2B is a schematic depiction of tooth pointing and tooth undercutting of a tooth flank on a side gear of a gear train.

The side gears 12 may be located on opposing sides of the pinions 14. The face of each side gear 12 that has helical teeth 17 may be configured for engagement with the pinions 14. The helical teeth 17 of the side gear 12 may have tooth flanks 19 that feature complex geometry. Helical teeth of a conventional design on a side gear may be vulnerable to tooth pointing and/or to tooth undercutting. Referring now to the schematic illustration of FIG. 2B, tooth pointing may occur at the outer diameter of a conventional side gear and tooth undercutting may occur at the inner diameter of a conventional side gear. In particular, tooth pointing may result in the pointing of the top profile of the tooth, such that the angle $\phi_o$ of the side profile of the pointed tooth is greater than angle $\phi$ of the side profile of the normal tooth. Tooth undercutting may result in the increased flattening of the top profile of the tooth, such that the angle $\phi_f$ of the side profile of the undercut tooth is less than the angle $\phi$ of the side profile of the normal tooth. Both tooth pointing and tooth undercutting are generally undesirable. In particular, side gear tooth pointing may reduce the torque capacity of a gear train with split torque and should be eliminated. Furthermore, side gear tooth undercutting may prohibit the forging of side gears, which is essential for high volume gear manufacturing.

Figure 2C:
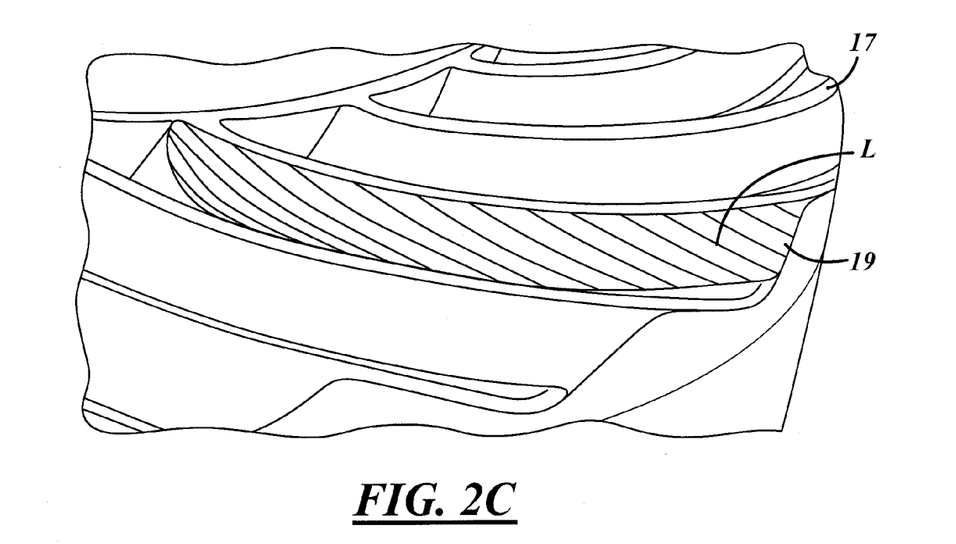
FIG. 2C is a schematic illustration of the lines of contact of a tooth flank on a side gear of a gear train in accordance with an embodiment of the invention.

The use of a helical face gear for the side gear 12 in an embodiment, as well as computation of appropriate design parameters for the pinions 14 and side gear 12, may help address issues such as tooth pointing and tooth undercutting in accordance with an embodiment of the invention. Referring now to FIG. 2C, a schematic illustration of the lines of contact (e.g., contact lines L) on a tooth flank 19 of helical teeth 17 of side gear 12 of a gear train 10 is shown. Although contact line L references a single line of contact as illustrated, there may be different contact lines L at various instants of time. As the pinion 14 and side gear 12 rotate, the line of contact L travels across the tooth flank 19 and occupies different positions within the tooth flank 19 of the side gear 12, as generally illustrated in FIG. 2C. Because of the geometry of the tooth flank 19, the line of contact L may not only travel (e.g., migrate) across the tooth flank 19 and occupy different positions within the tooth flank 19 of the side gear 12, the line of contact L may change shape. FIG. 2C illustrates both the travel (e.g., migration) and the changing shape of the lines of contact L. The family of lines of contact L within the tooth flank 19 of the side gear 12 correspond to various different instants of time. The longer the lines of contact L, the higher the contact ratio. In an embodiment, the desired contact ratio is in the range of 1<u<1.2. A contact ratio u less than 1 (i.e., u<1) is generally undesirable as the gear mesh between the side gear 12 and pinions 14 may be interrupted under such a scenario. A contact ratio u greater than 1.2 (i.e., u>1.2) may entail a corresponding increase in helix angle on the pinion 14, as well as of a spiral angle on the side gear 12, and generally does not provide advantages.

The number of helical teeth 17 (i.e., the gear tooth number) of each side gear 12 may be equal to the number of pinions 14 times an integer number. With this tooth number, the pinions 14 may be distributed evenly in the circumferential direction around the side gear 12. The even distribution of pinions 14 around the circumference of the side gear 12 (e.g., wherein the pinions are equi-angularly spaced around the circumference of the side gear 12) may be preferred. However, in other embodiments, the pinions 14 may be distributed in various other configurations, including those having an uneven spacing of pinions 14 around the circumference of the side gear 12.

The plurality of pinions 14 may be provided to transmit torque to the one or more side gears 12 and/or from one side gear 12 to another side gear. The number and size of the plurality of pinions 14 may vary. However, there is at least two pinions 14 in gear train 10 since the gear train 10 is designed to improve torque sharing among multiple pinions. For example, and without limitation, the number of pinions in gear train 10 may be six to eight pinions. Although this particular range for the number of pinions is mentioned in detail, there may be fewer or more pinions in other embodiments of the invention. In an embodiment, each of the plurality of pinions 14 may be generally cylindrical in shape. Further, each of the plurality of pinions 14 may have a first end 18, a second opposing end 20, and a longitudinal axis 21. The pinions 14 may be configured to provide flexibility with respect to the number of helical teeth and gear tooth geometry. The number of teeth on the pinions 14 may be considered a low tooth count relative to the size of the pinions 14.

Figure 3:
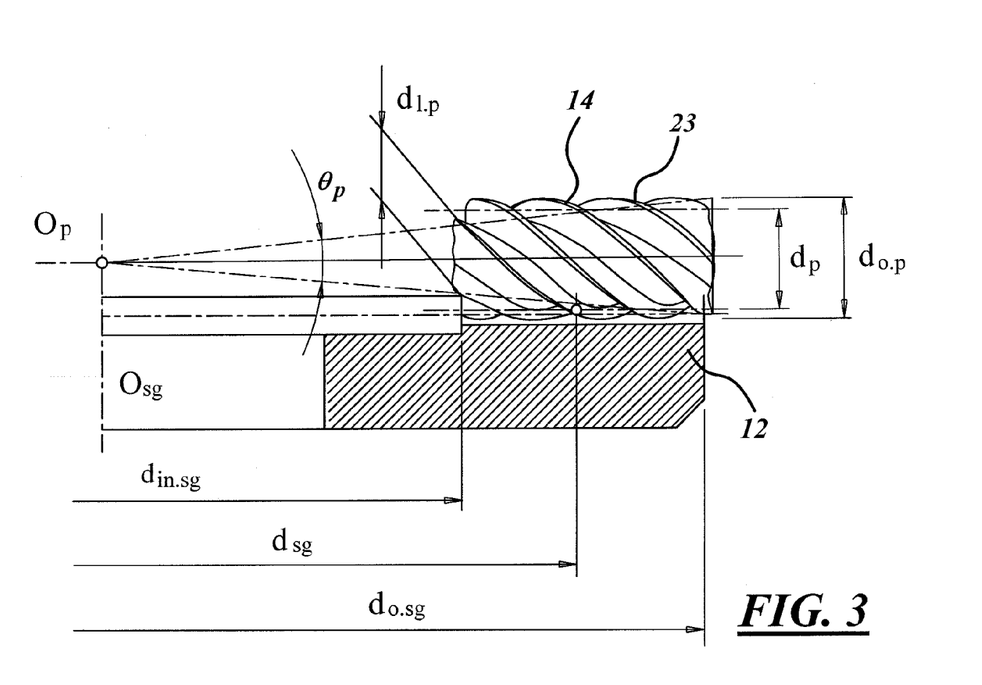
FIG. 3 is a schematic illustrating the apex angle of a pinion for use in connection with a gear train in accordance with an embodiment of the invention.
Figure 4:
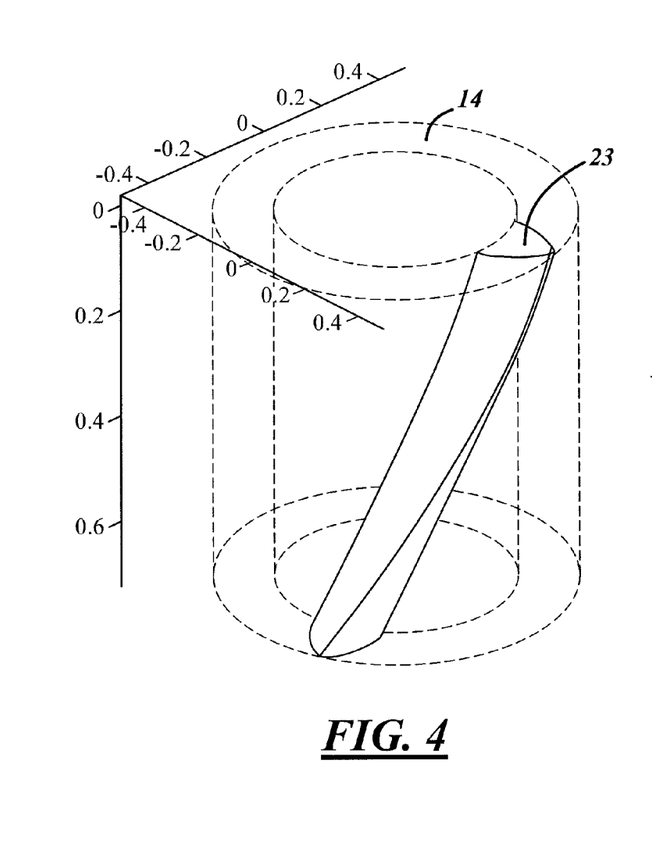
FIG. 4 is a schematic illustration of a tooth on a pinion of a gear train in accordance with an embodiment of the invention.

Referring now to FIG. 3, a schematic illustrating an apex angle $\theta_p$ of a pinion 14 in accordance with an embodiment of the invention is shown. The apex angle $\theta_p$ may be very low (e.g., less than about 20°) as compared to other gear designs. The apex angle $\theta_p$ may be subject to the following equation:

$$\theta_p \le \sin^{-1}\left(\frac{d_{o.p} - d_{l.p}}{d_{o.sg} - d_{in.sg}}\right),$$

where $d_{o.p}$ is the outer diameter of the pinion 18, $d_{l.p}$ is the limit diameter of the pinion, $d_{o.sg}$ is the outer diameter of the side gear, and $d_{in.sg}$ is the inner diameter of the side gear. Each of the plurality of pinions 14 may comprise a helical pinion (i.e., have helical teeth 23). The teeth 23 of the pinion 14 may appear as shown in FIG. 4, which is an illustration of the tooth 23 on a pinion 14 of a gear train 10 in accordance with an embodiment of the invention. The plurality of pinions 14 may be assembled in a housing (not shown). For example and without limitation, the housing may comprise a differential case. A ring gear (not shown) may be connected to an input source and/or drive source (not shown) in a conventional manner known in the art and may also be connected to the housing.

Because every pinion 14 is engaged in mesh with both side gears 12 simultaneously, the axial thrust of a first pinion 14 in mesh with a first side gear 12 is substantially equal to the axial thrust of a second pinion 14 in mesh with a second, opposing side gear 12. In this way, the axial load that is acting on the housing (i.e., a differential case) from the pinions 14 may be of approximately zero value. By having the axial load that is acting on the housing (i.e., a differential case) be of approximately zero value, the housing may be designed with thinner walls as compared to conventional housings for gear trains (e.g., differential cases).

Figure 5:
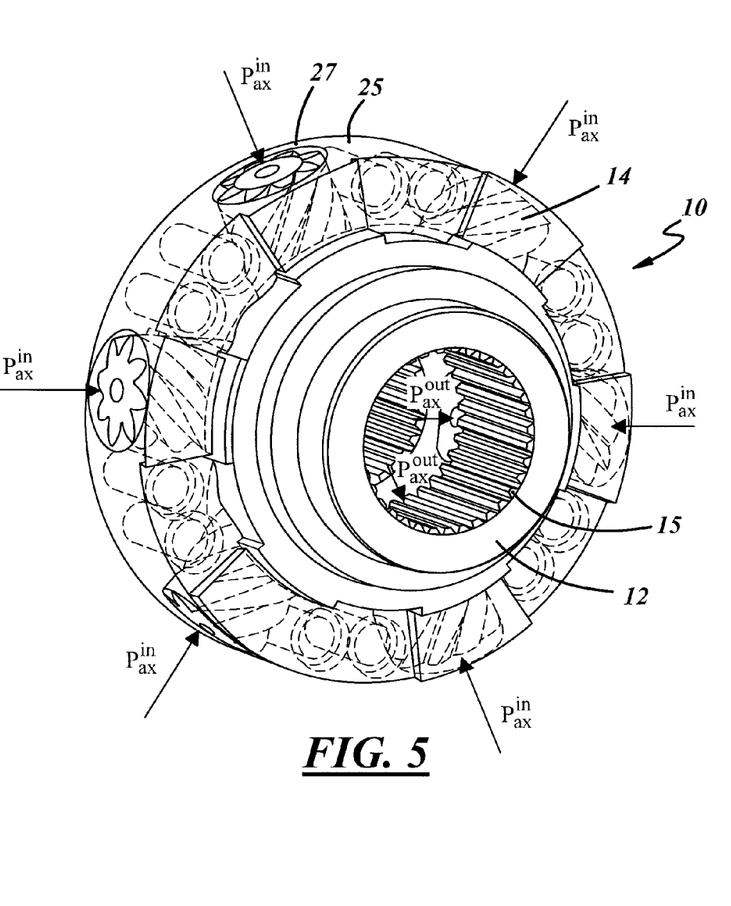
FIG. 5 is a schematic illustrating the axial forces acting on each pinion of a gear train in accordance with an embodiment of the invention.

Torque may be transmitted in the gear train 10 (i.e., from the ring gear to the side gears 12) either with or without the use of a torque ring 25 (see, e.g., FIG. 5). When torque is transmitted in gear train 10 with a torque ring 25, the torque ring 25 may be mounted within and enclosed by the housing (e.g., the differential case). The torque ring 25 may be generally ring shaped and may be provided for locating one or more pinions 14 between the side gears 12. The torque ring 25 may include a plurality of radially inwardly extending holes 27 extending into the torque ring 25 from an outer radial surface of the torque ring 25. The pinions 14 may be disposed within the holes 27. In this way, the pinions 14 may be circumferentially spaced around the torque ring 25. The pinions 14 may freely rotate in the holes 27 of the torque ring 25. The pinions 14 may be axially trapped between the inner surface of the housing and a radially inwardly portion of the torque ring 25. The housing and the torque ring may thus substantially or fully restrain the pinions 14 from axial movement. The torque ring may further include channels in its side surfaces. The channels may be configured to allow and/or confine the pinions 14 to be in meshing engagement with the side gears 12. This is because the helical face of each side gear 12 may extend into one of the channels in the side surfaces of the torque ring 25, and the helical teeth 23 of each pinion 14 may also extend into the opposed channels in the side surfaces of the torque ring 25 for engagement with the side gears 12. In an embodiment, the torque ring 25 may exert pressure on the pinions 14 to move them radially about an axial center line 13 of the side gears 12. Due to the meshing engagement between the pinions 14 and the side gears 12, the side gears 12 may be forced to turn about their axial centerline 13. Because the output (e.g., axle shafts) are coupled to the side gears 12, the motor vehicle may move.

When torque is transmitted in gear train 10 without a torque ring 25, the pinions 14 may be configured to rotate on axles (not shown), for example, as is conventional in the art. Whether the torque is transmitted with or without a torque ring 25 in gear train 10, each of the plurality of pinions 14 may be in meshing engagement with two side gears 12 simultaneously. The side gear 12 and the pinions 14 may thus share torque via gear meshing.

With a possibility for manufacturing errors with conventional gear trains, misalignment of the axis of the pinions 14 and the axis 13 of the side gear 12, as well as other deviations from proper meshing between the pinions 14 and the side gear 12, may occur. Such misalignment and deviation may result in unequal sharing among the pinions 14 of the torque that is transmitted through the gear train 10. Accordingly, one of the plurality of pinions 14 may be loaded heavier, while the rest of the plurality of pinions 14 may be loaded to a lesser degree. In some circumstances, some pinions 14 may be idle (i.e., not loaded at all). When torque is not shared equally among the plurality of pinions 14, the most heavily loaded pinion 14 may bear the critical load and may be the first and most likely pinion to break under the load. Equal torque sharing among the plurality of pinions 14 may be especially advantageous for a gear train that features high torque density.

Rather than solely looking to increase accuracy in connection with the manufacturing of pinions 14 and side gears 12 that make up a gear train 10 (i.e., to avoid manufacturing errors, which may include significant costs), the inventive gear train 10 may include an absorber 16 configured to provide an axial force on at least one of the plurality of pinions 14. The absorber 16 may also be configured for, among other things, absorbing manufacturing errors that may cause misalignment of the pinions 14 and side gear 12

Referring again to FIG. 1, absorber 16 may comprise one or more elastic absorbers or other means for providing an axial force on at least one of the plurality of pinions 14. A first absorber 16₁ may be placed at the first end 18 of each pinion 14. A second absorber 16₂ may be placed at the second end 20 of each pinion 14. Each absorber 16₁, 16₂ may have a predetermined dimension (e.g., thickness) in order to absorb the manufacturing errors that may cause misalignment. The dimension of each absorber 16₁, 16₂ is therefore, a function of, or is related to, the manufacturing error that is intended to be absorbed. In an embodiment, each absorber 16₁, 16₂ may also exhibit a predetermined stiffness and/or rigidity, which can be expressed in terms of the design parameters of the gear train 10 (e.g., the manufacturing error that is intended to be absorbed) and of the amount of torque being transmitted. The amount of torque being transmitted may depend on the predetermined value of the differentiation between side gears 12. Each absorber 16₁, 16₂ may also allow slight movement for variances in the meshing engagement between the pinions 14 and the side gear 12.

The predetermined stiffness and/or rigidity for each absorber 16₁, 16₂ may be expressed mathematically. In an embodiment, to derive the mathematical expression for the stiffness and/or rigidity for each absorber 16, the number of pinions 14 in gear train 10 may be designated as n, wherein n is $\geq 2$. The total error to be absorbed by absorber 16 (e.g., absorbers 16₁, 16₂) may be designated as $\delta_T$. Due to the various manufacturing errors, one of the pinions 14 is the first to be loaded, and another pinion 14 is the last to be loaded with a corresponding portion of the operating load. With multiple pinions 14, it may not be known at what instant of time the remainder of the pinions 14 of gear train 10 are loaded and/or how the rest of the pinions are loaded. The actual load sharing among the pinions 14 in gear train 10 may be specific for each individual gear train. If the number of pinions 14 is sufficiently large, then a normal (i.e., Gaussian) distribution of the load among the pinions may be utilized. If the number of pinions 14 is not sufficiently large (e.g., there are only a few pinions 14 as in the design of a gear train 10 with split torque in accordance with an embodiment of the invention), then a reasonable assumption regarding the load sharing among pinions may be made. The pinion 14 that is the first to transmit torque in gear train 10 may be denoted as $n_{max}$, and may be more heavily loaded as compared to the remainder of the pinions 14. The pinion 14 that is the last to transmit torque in gear train 10 may be denoted as $n_{min}$, and may be the least loaded pinion 14 as compared to the remainder of the pinions 14.

The maximum torque being transmitted through the gear train may be designated $T_\Sigma$. Accordingly, the maximal torque being transmitted by one pinion $T_i$ is equal to the following equation:

$$T_i = \frac{T_\Sigma}{n}.$$

The portion $T_i$ of the entire torque $T_\Sigma$ (i.e., the maximal torque being transmitted by one pinion) is transmitted by the most heavily loaded pinion $n_{max}$. The rest of the pinions may be loaded with lower torque. The pinion that is the last to transmit torque in the gear train 10 (i.e., $n_{min}$) may transmit a portion of the torque that is denoted as $t_i$. A permissible difference between $T_i$ and $t_i$ may be specified by a torque factor $k_T$, which may be equal to the following equation:

$$k_T = \frac{T_i - t_i}{T_i}.$$

For example and without limitation, the torque factor $k_T$ may be equal to $k_T=0.1$. This torque factor $k_T$ corresponds to that variation of the pinion loading which does not exceed 10%. This also means that torque actually transmitting through the gear train 10 may be 10% less than the desired torque $T_\Sigma$. When the pinion 14 that is the first to transmit torque in gear train 10 (i.e., $n_{max}$) is transmitting the maximal portion $T_i$ of the torque, then the pinion 14 that is the last to transmit torque in the gear train 10 (i.e., $n_{min}$) is transmitting the portion $t_i$ of the torque. The portion $t_i$ can be expressed in terms of the gear train parameters as set forth in the following equation: $t_i = T_i(1-k_T)$. For any particular application, the rest of the pinions 14 in the gear train 10 (e.g., n−2 pinions) can be equally loaded, each carrying a portion of torque $\tau_i$. The portion of torque loaded onto the remainder of the pinions 14 can be set forth in the following equation:

$$\tau_i = \frac{T_i + t_i}{2}.$$

Substituting for $t_i$ as set forth above, the expression for the computation of the portion of torque loaded onto the remainder of the pinions 14 is set forth in the following equation:

$$\tau_i = \frac{T_i + t_i}{2} = \frac{T_i + T_i(1 - k_T)}{2} = T_i \frac{1 - k_T}{2}.$$

Under this scenario, the total load $T_{\Sigma=Ti}+t_i+\tau_i(n-2)<T_\Sigma$. As of the instant of time when the pinion 14 that is the last to transmit torque in the gear train 10 (i.e., $n_{min}$) is starting to transmit torque, the pinion 14 that is the first to transmit torque in gear train 10 (i.e., $n_{max}$) moves relative to the rest of the pinions 14 at a distance that is equal to the resultant error $\delta_T$. While absorbing the error $\delta_T$, torque through the pinion $n_{max}$ increases $k_T$ times (i.e., the torque increases by $k_T \cdot T_i$). Therefore, the required stiffness $q_T$ of the absorbers 16$_1$, 16$_2$ is equal to the following equation:

$$q_T = \frac{k_T \cdot T_i}{\delta_T}.$$

The torque capacity of the gear train 10 may be improved by proper load sharing among the pinions 14.

Referring now to FIG. 5, a schematic illustrating the axial forces acting on each pinion 14 of a gear train 10 in accordance with an embodiment of the invention is shown. Referring now to FIGS. 1 and 5, the absorbers 16 may create two axial forces $P_{ax}^{in}$, $P_{ax}^{out}$ acting on every pinion 14. The axial forces $P_{ax}^{in}$, $P_{ax}^{out}$ may cancel each other out (i.e., $P_{ax}^{in}=P_{ax}^{out}$) when no manufacturing errors are observed. Under this circumstance, the axial forces $P_{ax}^{in}$, $P_{ax}^{out}$ are of the same magnitude and may be oppositely pointed or directed. The axial force $P_{ax}^{in}$ is pointed or directed radially inwardly, toward the axis 13 of the side gear 12. The axial force $P_{ax}^{out}$ is pointed or directed radially outwardly, away from the axis 13 of the side gear 12. Under this scenario, equal torque sharing among all pinions 14 may occur. However, this scenario (i.e., in which no manufacturing errors are observed are ideal only). When a manufacturing error is present, then the equality $P_{ax}^{in}=P_{ax}^{out}$ is no longer valid. The inequality $P_{ax}^{in} \neq P_{ax}^{out}$ is valid instead. The absorbers 16 may be configured to push the corresponding pinion 14 in an axial direction through a distance at which the equality $P_{ax}^{in}=P_{ax}^{out}$ may be restored. In this way, equal torque sharing among the pinions 14 may be ensured. Absorbers 16 may thus axially restrain each pinion 14 under some compressive load so that the load is equalized on each pinion 14.

Figure 6:
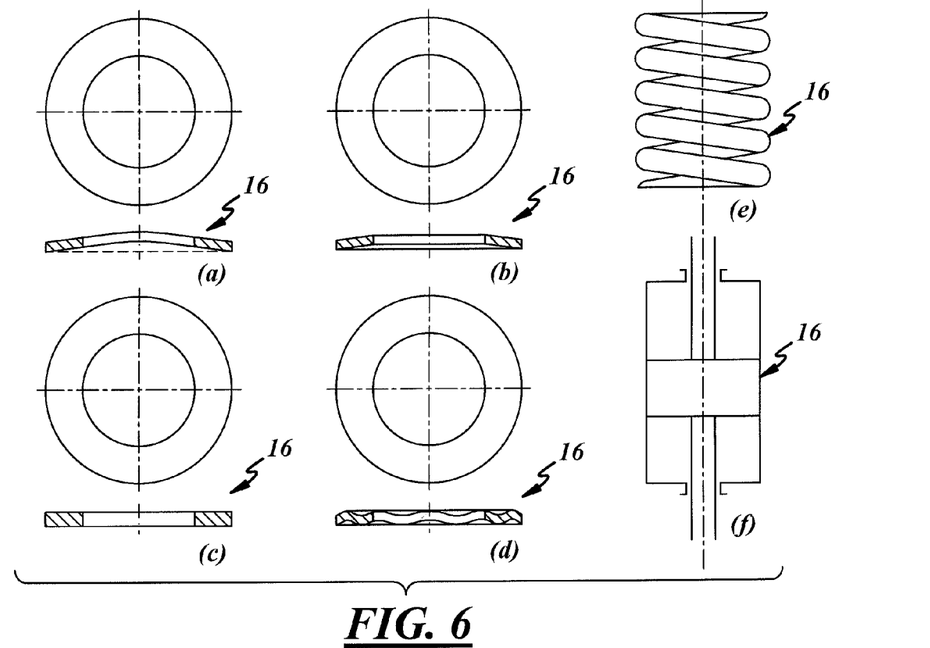
FIG. 6 is an illustration of several examples of an elastic absorber that may be used in a gear train in accordance with embodiments of the invention.

Referring now to FIG. 6, a top view of several examples of a design of the absorbers 16$_1$, 16$_2$ that may be used in a gear train 10 in accordance with various embodiments of the invention are illustrated. For example, FIG. 6(*a*) illustrates an absorber 16$_1$, 16$_2$ comprising an elastic shim bended in a diametrical direction. Generally, to function as absorber 16$_1$, 16$_2$, an elastic shim must be modified to have a predetermined dimension (e.g., thickness) and predetermined stiffness. FIG. 6(*b*) illustrates an absorber 16$_1$, 16$_2$ shaped in the form of a "dish" (e.g., a truncated cone) FIG. 6(*c*) illustrates an absorber 16$_1$, 16$_2$ made of elastic material, such as rubber, plastic, or other similar material. FIG. 6(*d*) illustrates an example of a wavy absorber 16$_1$, 16$_2$ made of steel, for example. FIG. 6(*e*) illustrates an absorber 16$_1$, 16$_2$ comprising a spring. FIG. 6(*f*) illustrates an absorber 16$_1$, 16$_2$ comprising a two-chamber cylinder with a piston that acts on compressed air. The thickness and rigidity and/or stiffness of each absorber may vary. Although these examples are shown and illustrated in detail for the absorbers 16$_1$, 16$_2$, other absorbers may used in accordance with other embodiments of the invention.

Figure 7:
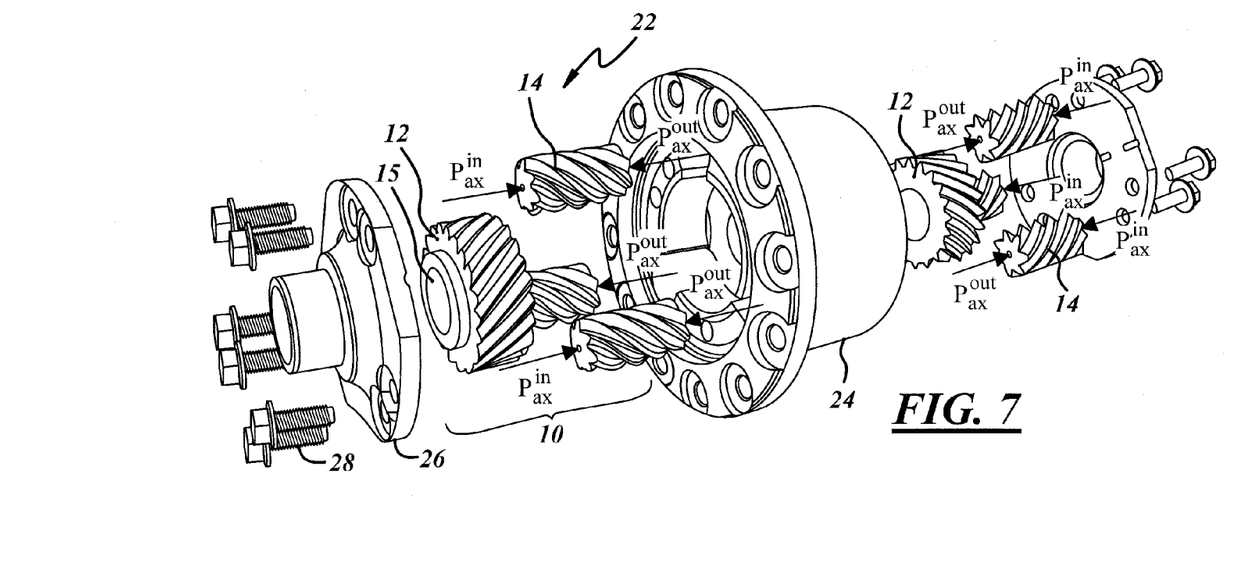
FIG. 7 is an exploded view of a differential including a gear train in accordance with an embodiment of the invention.
Figure 8:
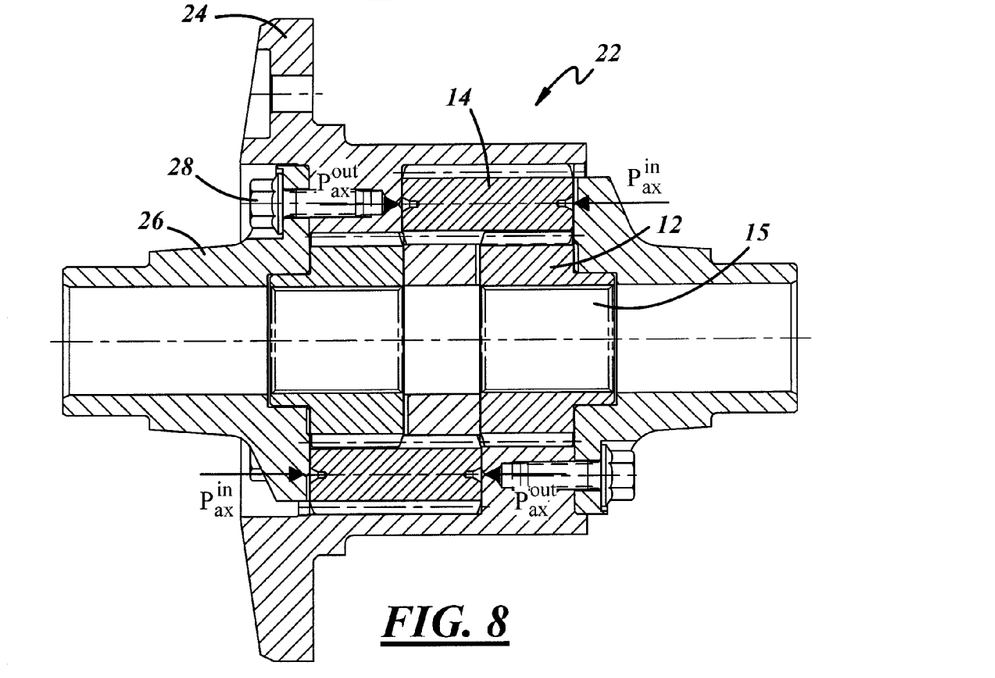
FIG. 8 is a sectional view of a differential including a gear train in accordance with an embodiment of the invention.

Referring now to FIGS. 7 and 8, an exploded view and a cross-sectional view of a differential 22 including a gear train 10 are respectively shown. As illustrated, differential 22 may comprise a locking differential. Although a locking differential is mentioned and shown in detail, the differential 22 may comprise other types of differential in other embodiments of the invention. For example, the differential 22 may comprise an open differential, a limited slip differential, and/or a locking differential in various embodiments. Differential 22, in any of its various embodiments, may include a gear train 10 in accordance with an embodiment of the invention. Differential 22 may also include a differential case 24, cover 26, and one or more fasteners 28 for connecting the different case 24 and cover 26. Differential 22 may be provided to allow a motor vehicle to negotiate turns, while maintaining power to both the left and right wheels of a drive axle. An open differential may allow two axle wheels to rotate at different speeds, but may provide the greatest risk of a motor vehicle remaining stuck because of the inability to force torque transfer to the wheel that has the most traction. A limited slip differential may include a means to limit the slippage associated with an open differential (e.g., a clutch pack configured to limit the amount of slippage by transferring a portion of the power from one wheel to another wheel). A locking differential may be configured to fully lock (e.g., automatically or selectably) when excessive wheel slippage occurs in order to provide full power to both wheels.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims. It is intended that the scope of the invention be defined by the claims appended hereto and their equivalents.

What is claimed:

1. A gear train, comprising:
   at least one side gear comprising a helical face gear;
   a plurality of helical pinions in meshing engagement with the helical face gear;
   a first absorber configured to directly engage a first end of at least one of the plurality of helical pinions, the first absorber configured to provide an axial force on the at least one of the plurality of helical pinions in a first direction; and
   a second absorber configured to directly engage a second end of the at least one of the plurality of helical pinions, the second absorber configured to provide an axial force on the at least one of the plurality of helical pinions in a second direction opposing the first direction.

2. The gear train of claim 1, wherein a desired contact ratio between the helical face gear and at least one of the plurality of helical pinions is between the range of about 1 to about 1.2.

3. The gear train of claim 1, wherein the gear tooth number of the at least one side gear may be equal to the number of the plurality of helical pinions times an integer number.

4. The gear train of claim 1, wherein the plurality of helical pinions are equi-angularly spaced around the circumference of the side gear.

5. The gear train of claim 1, wherein each of the plurality of helical pinions may have a low tooth count.

6. The gear train of claim 1, wherein the helical pinion has an apex angle that is governed by the following equation:

$$\theta_p \leq \sin^{-1}\left(\frac{d_{o.p} - d_{l.p}}{d_{o.sg} - d_{in.sg}}\right),$$

where $d_{o.p}$ is the outer diameter of the pinion, $d_{l.p}$ is the limit diameter of the pinion, $d_{o.sg}$ is the outer diameter of the side gear, and $d_{in.sg}$ is the inner diameter of the side gear.

7. The gear train of claim 1, further comprising:
 a housing in which the at least one side gear and the plurality of helical pinions are disposed; and
 a ring gear connected to the housing and an input source.

8. The gear train of claim 1, wherein the absorber comprises an elastic absorber.

9. The gear train of claim 1, wherein the absorber comprises a predetermined stiffness.

10. The gear train of claim 1, comprising a first side gear and a second side gear.

11. The gear train of claim 10, wherein the first side gear is disposed on a first side of the plurality of helical pinions and the second side gear is disposed on a second side of the plurality of helical pinions, wherein the first side is opposite to the second side.

12. The gear train of claim 1, further comprising a torque ring for housing and locating the plurality of helical pinions proximate the side gear, wherein the torque ring includes a plurality of radially inwardly extending holes extending from an outer radial surface of the torque ring and the plurality of helical pinions are disposed in the plurality of holes.

13. The gear train of claim 12, wherein the first direction is a radially inwardly extending direction from the outer radial surface of the torque ring toward an axis of rotation of the side gear.

14. The gear train of claim 13, wherein the second direction is a radially outwardly extending direction from the axis of rotation of the side gear toward the outer radial surface of the torque ring.

15. The gear train of claim 14, wherein the first absorber and the second absorber is each configured to provide an axial force in the first direction or second direction.

16. The gear train of claim 15, wherein the first absorber and the second absorber are configured to provide axial forces so that the sum of the axial forces acting on the at least one of the plurality of helical pinions in a first direction is substantially equal to the sum of the axial forces acting on the at least one of the plurality of helical pinions in a second direction.

17. A differential, comprising:
 a differential case; and
 a gear train disposed in the differential case, the gear train comprising:
  at least one side gear comprising a helical face gear;
  a plurality of helical pinions in meshing engagement with the helical face gear;
  a first means configured to directly engage a first end of at least one of the plurality of pinions for providing an axial force on at least one of the plurality of pinions in a first direction; and
  a second means configured to directly engage a second end of the at least one of the plurality of pinions for providing an axial force on the at least one of the plurality of pinions in a second direction opposing the first direction.

* * * * *